United States Patent [19] [11] 4,369,217
Leistritz [45] Jan. 18, 1983

[54] CAVITY-FORMING SUPPORT ELEMENT MADE OF EXTRUDED HOLLOW SECTIONS IN COMBINATION WITH CLOSURE MEMBERS OF OTHER MATERIALS OR ALLOYS

[76] Inventor: Hans K. Leistritz, Stegwiesen 8, D 7891 Kussaberg 2, Fed. Rep. of Germany

[21] Appl. No.: 83,759

[22] Filed: Oct. 11, 1979

[51] Int. Cl.[3] .......... B32B 3/20

[52] U.S. Cl. .......... 428/596; 123/195 R; 280/796; 280/798; 428/586; 428/598

[58] Field of Search .......... 428/596, 598, 586; 422/173; 165/54, 162, 178; 123/195 R; 280/796, 798

[56] References Cited

U.S. PATENT DOCUMENTS

| | | | |
|---|---|---|---|
| 813,918 | 2/1906 | Schmitz | 428/596 X |
| 1,926,460 | 9/1933 | Slagel | 165/178 X |
| 2,000,653 | 5/1935 | Wilkinson | 165/178 X |
| 2,173,956 | 9/1939 | Roberts | 123/195 R |
| 2,919,133 | 12/1959 | Eggers | 428/598 X |
| 3,114,471 | 12/1963 | Kröpfl | 165/178 X |
| 3,131,727 | 5/1964 | Powell | 428/586 X |
| 3,896,873 | 7/1975 | Wolowodiuk et al. | 165/162 X |
| 3,989,469 | 11/1976 | Leistritz | 181/224 X |

*Primary Examiner*—Richard D. Lovering
*Attorney, Agent, or Firm*—Watson, Cole, Grindle & Watson

[57] ABSTRACT

A cavity forming structural support assembly for a chassis element of an internal combustion engine incorporates an elongated member made of metal or fiber reinforced plastic material having a peripheral wall with a plurality of internal longitudinally extending wall portions defining a longitudinally extending cavity and further including a plurality of secondary longitudinal cavities at least partially surrounding the primary cavities. The elongated member is capped by a material different than that of the elongated member to form a respective end thereof and to include transverse walls forming cavities within the elongated member and enclosing the secondary longitudinal cavities. The respective caps include a portion extending inside the walls of the hollow section chamber and in pressing engagement therewith. A support member extends transversely into the primary cavity and is connected to the inner wall portion of the cap. Fluid is permitted to flow through the elongated member via the cavity and the secondary longitudinal cavities.

3 Claims, 5 Drawing Figures

CAVITY-FORMING SUPPORT ELEMENT MADE OF EXTRUDED HOLLOW SECTIONS IN COMBINATION WITH CLOSURE MEMBERS OF OTHER MATERIALS OR ALLOYS

BACKGROUND OF THE INVENTION

1. Field of the Invention

The invention relates to a frame and support element as a composite structure with production largely from aluminium or aluminium-fibre reinforced plastics and similar materials, the extrusion process being used as the method of production.

Such support or frame elements are torsion-resistant and are to be designed in accordance with the strength criteria of the particular field of application. Generally, they are directed toward the possibilities offered by steel in respect of production costs and material properties. The composite structural combination described below has the object of so combining, in the structural unit of a frame or support element, different types of materials to form an integral element that, firstly, the frame or support element simultaneously acquires, exceeding this apparatus function, the property of a multiply differentiatable hollow body which is suitable for the development of the most varied apparatus functions, for example motor drive elements mounted in frames. Secondly, the composite structure should be suitable for so providing any point of force application in the support element that the lines of action of the force pass into the material having the greater strength or into a zone such that the properties of the mutually combined materials effectively complement one another: thus, for example, a thin-walled steel tube, by positive insertion into a double-walled aluminium hollow section member strengthened with longitudinal ribs, may thus lose any degree of freedom for the design of a vibration response. Accordingly, in the design to be determined from the field of application, it is necessary to devise an extremely rigid support and frame component which simultaneously combines in itself in a rational manner, in the form of an integral element, advantages of strength and functional progress which are derived from the purpose of the apparatus and are largely developed in hollow bodies.

This object is achieved in that the hollow section member which has no cross-walls and which is at least partly multiple-walled, is so inserted in closing and composite or combining members applied by pressure against its open ends that each of these closing and connecting members is in positive contact with at least two different shaped parts. These contact zones have a double structure: one at the periphery of the hollow section, as a rule simultaneously representing (in the case of axial contact pressure) the contact zone of closing member/hollow section, the other with greater depth of penetration inside the walls of a hollow-section chamber, which simultaneously enclose within themselves the support (rod) axis. Finally, it is necessary to have another main feature that the formation of cross-walls is accomplished by, or by means of, the closing and composite members, that is either inside the closing-member cavity or with a depth of penetration into the hollow section inside a hollow-section cavity. These closing members braced against one another simultaneously have the property of a composite body from several aspects. Since as a rule they consist of steel sheet or chrome-steel sheet (or nickel-plated plain sheet steel to avoid contact corrosion in respect of aluminium), initially they lie within the high strength values of these materials. It is possible for force-application points to be formed on them, without the need for multiple screw fastenings and material accumulations as for the formation of moments of force on cast aluminium parts. Furthermore, since each force is a vector and is practically always constantly distributed superficially, the lines of force from the load application to the closing member extend well into the material composite field of the rigidly designed support part, in which case the positive or interlocking contact at the periphery and the second positive contact with axial penetration depth have particular significance since thereby the form stability of the aluminium member is brought into the force field. In this way it is possible to control the load at any point of force application even in respect of the longitudinally and transversely acting components, therefore all the combined stresses from tension, compression, bending and torsion. Resistance to torsion may precisely be achieved by providing in addition to the axial pressure also radial pressure, as shown in FIG. 5.

BRIEF DESCRIPTION OF THE DRAWINGS

The above objects, features and advantages are readily apparent from a description of the preferred embodiments of the best mode of carrying out the invention when taken in conjunction with the following drawings.

DETAILED DESCRIPTION

Figure 1:
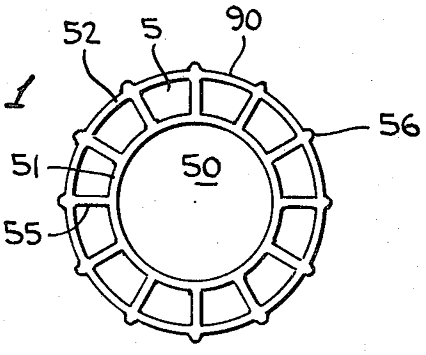
FIG. 1 shows a cross-section of a double-wall, one-piece tubular chassis in accordance with the invention.
Figure 2:
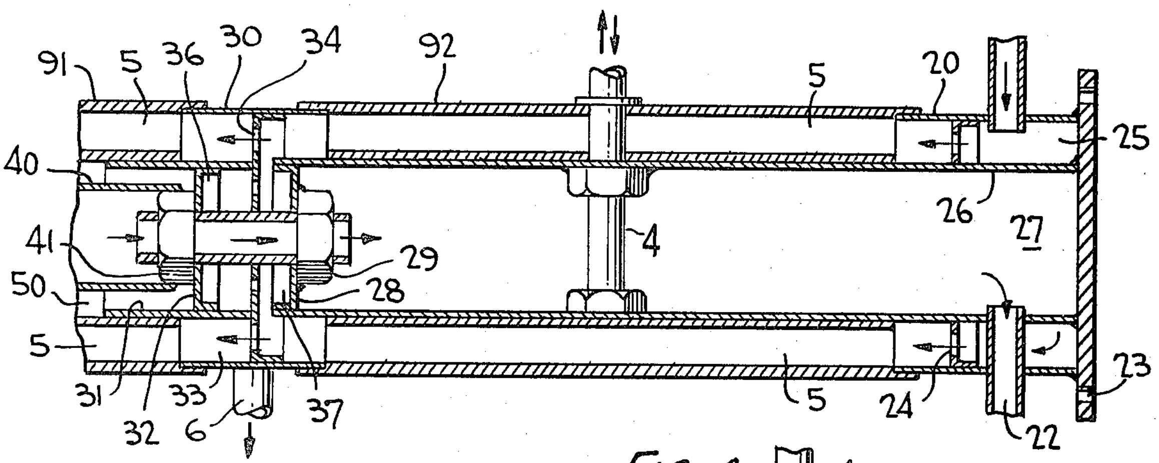
FIG. 2 is a cross-section through a chassis in accordance with the invention and showing the mounting of a support rod therein.

FIGS. 2 to 5 illustrate diagrammatically another essential property of this composite structure. They show that from any outer position of the material external shell having lower strength not only can a force-application point be made possible, which is anchored in the material having greater strength, but also by using hollow structural elements an inlet or outlet path for media which pass into the cavities formed. This latter is illustrated in FIG. 2 on the basis of a closing member. Since the diagrammatic drawings 2 to 5 illustrate comprehensively a plurality of the force and inflow connections possible in this case, they merely give the appearance of a complicated design. In an individual application it is frequently sufficient to make do with a limitation to the closing and composite or combining members as respective starting zones. Similarly, FIG. 3 also has the nature of a limiting case, since its starting point is a partly single-walled hollow-section extruded aluminium component. From the point of view of "all round" shape stability of an extruded aluminium section member, the section (90) shown in FIG. 1 represents the almost ideal type. The double walls 51, 52* are mutually reinforced by longitudinal ribs 55, with simultaneous formation of small cavities 5, and the inner cavity 50 encircles the longitudinal axis of the hollow section member. Closing-member insert parts, such as the tube 26 of the closing member 20 (FIG. 2) or the tube 31 of the closing member 30 (FIG. 2), applied positively against its internal wall 51 provide additional stability and resistance to the formation of vibrations, even if they are made of chrome steel. This latter effect can be intensified by surrounding edges of a wall 71 closing the insert part 70 about a pipe 72 (FIG. 4) used for bracing, so that in many cases only a slight penetration depth (70) is adequate. A pressure directed from the interior of the insert part 80 (FIG. 5) against the inner wall 51 of the hollow member 94 can compensate forces applied from the main part 80 of the closing member (not shown) so that the insert part 90 remains resistant to torsion. FIG. 2 shows the double fastening of a steel rod 4, against which a force application takes place, inside an insert part 26.

Numerals used in French-language text

In FIG. 2, 21 is an inlet, for example, for exhaust gases and support rod 6 is provided for supporting the double-wall element illustrated therein within a motor vehicle. Element 23 represents the cap on tube 26; perforated wall 24 is provided to conduct fluid into channel 5, and duct 25 is blocked by cap 23. Hexagonal nut 29 retains duct 35 and abuts against inner wall 28 of closing member 30. Similarly, hexagonal nut 41 retains duct 35 and abuts against end wall 32 of closing member 30. The outer wall 56 of the double-wall chassis element is illustrated in FIG. 1.

Figure 3:
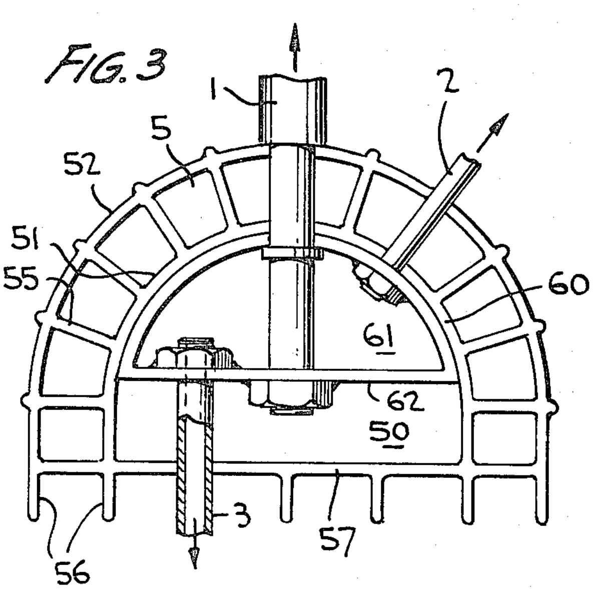
FIG. 3 is a cross-section of a dome-shaped capping means including a support structure mounted therein.
Figure 4:
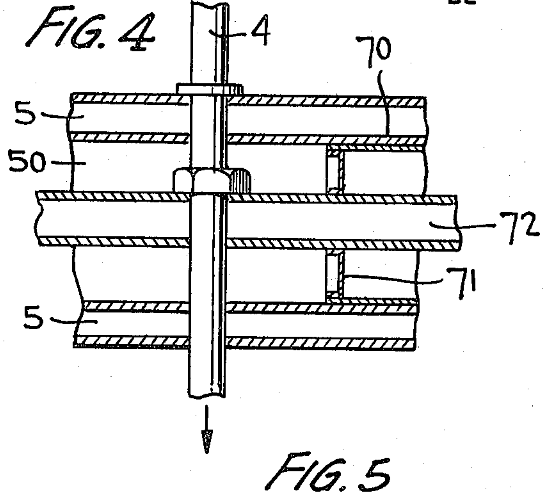
FIG. 4 is a modified embodiment showing a mounting of a support rod within a chassis of the invention.
Figure 5:
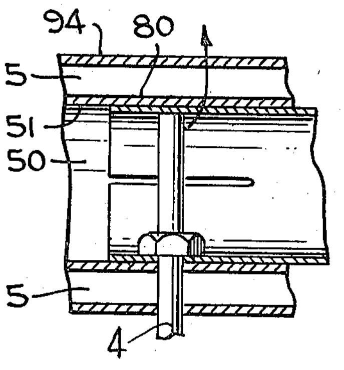
FIG. 5 is a further modification of the mounting of a support rod within the chassis of the invention.

FIG. 3 shows the fastening of externally introduced steel rods (1,2) and hollow body (3), which represent passageways for flowing media; said hollow body is situated between the series of hollow section members 91/92 (FIG. 2) in the screwed part 35 tightening the closing member and closing-member parts 26 and 40 respectively, which screwed part is rigidly secured to the walls 32 and 34 in the central closing member 30. FIG. 2 in particular includes indications concerning the greatly differentiated throughflow regulation of gaseous or liquid media, for which the supports simultaneously serve as a result of their integral function provided. By way of example, if the cavity formation inside the series 20/92/30/91 (together with return 40/35/27/22) had been designed as a series of silencing components, the cavity 37 could serve as a Helmholtz resonator and the cavity 36 as an acoustic branch chamber.

In FIG. 3, 57 represents a single wall of the chassis element. A dome-shaped capping means 60 with inner space 61 and lower wall 62 is shown mounted within the corresponding dome-shaped inner cavity of the double-wall chassis element.

When in the introduction to the description the aim of strength was designated as being the attainment of an extremely rigid body, this is to be understood as a super-elevation in design relative to the limit stress to be considered within the field of application of the equipment. An absolutely rigid body does not exist in practice and even the teachings on special structures consider their junction points more precisely as joints. Accordingly, it should be merely stated that all the numerous practical means are to be employed, which enable the extra tolerances always possible in composite systems to be avoided. FIG. 2 shows, for example, a simple means of this type for the fastening of the rod 4 in two nuts: since the angles of the thread starts in two nuts arranged in this way practically never correspond exactly, the entry of the rod into the second nut will practically always take place with difficulty, without it necessarily leading to destruction of the thread structures. This circumstance may be exploited as being favourable for the fastening of the rod. In the matter of this question purely of principle, it is stated that in many applications it is appropriate, instead of the closing and composite members, to make use of support parts inside the hollow section, in particular fastened to their shaped insert parts, as mounting position, supporting members or connecting junctions of frame members. The reason for this, already mentioned a number of times, is that for the magnitude of load of the force field applied to the rods a combined strength is formed, in which the strength value of the shaped steel part (e.g. 26 in FIG. 2) is increased by the shape-stability values of the shaped aluminium part (92). For equipment whose strength testing requires static tests as well as dynamic testing (tension impact, crushing pressure, impact bending), the structural study of the strength behaviour is recommended, particularly with strength-exceeding means, offered by this compound fastening of the support parts inside the hollow section. Since these elements may be combined as rods or hollow shafts to form force couples, a further means is provided of controlling all the force magnitudes with their possible transverse components by suitable structural composition.

Since the prerequisite for this lies simultaneously in the fact that the hollow-section/closing-member combination does not allow either additional tolerances resulting from different material expansions in the event of heat input, or generally loosening or slackening conditions in the cold state at ambient temperature, very special significance is attached to the concrete process by which hollow section members and closing members are fixed one inside the other. According to requirements, the effect can be improved with different complementary means: the spring or snap fastening/rotary fastening combinations including the hardenable compound introduced into the contact zone result in excellent fastenings for force applications from all possible directions. Simultaneously the production assembly is considerably more economical.

The rigid hollow section member described herein may consist of a light-weight rigid ceramic material of porous structure and which has a special surface hardening, for example formed by a self-curing ceramic dipping compound.

I claim:

1. Cavity forming structural support assembly forming a chassis element of internal combustion engines, comprising:

an elongated member made of metal or fiber reinforced plastic material including a peripheral wall having a plurality of internal longitudinally extending wall portions defining a longitudinally extending cavity and further including a plurality of secondary longitudinal cavities at least partially surrounding said primary cavities;

capping means formed from materials different than said elongated member and forming a respective end of the elongated member and including transverse walls forming cavities within said elongated member and enclosing said secondary longitudinal cavities, said capping means including a portion extending inside the walls of the hollow-section chamber and in pressing engagement therewith;

a support member extending transversely into the primary cavity of said elongated member and being connected to the inner wall portion of said capping means;

means permitting fluid to be passed through said elongated member via said cavity; and an additional support member including channels therein communicating with said secondary longitudinal cavity and a passageway for the flow of fluid within said primary longitudinal cavity.

2. Cavity forming structural support assembly forming a chassis element of internal combustion engines, comprising:

an elongated member made of metal or fiber reinforced plastic material including a peripheral wall having a plurality of internal longitudinally extending wall portions defining a longitudinally extending cavity and further including a plurality of secondary longitudinal cavities at least partially surrounding said primary cavities;

capping means formed from materials different than said elongated member and forming a respective end of the elongated member and including transverse walls forming cavities within said elongated member and enclosing said secondary longitudinal cavities, said capping means including a portion extending inside the walls of the hollow-section chamber and in pressing engagement therewith, one end of said capping means being dome-shaped to conform to the shape of an end portion of said elongated member;

a support member extending transversely into the primary cavity of said elongated member and being connected to the inner wall portion of said capping means;

means permitting fluid to be passed through said elongated member via said cavity; and a plurality of additional support members at least one of which extends through another portion of the dome-shaped cap means and at least another of said additional support members extending into said primary longitudinal cavity.

3. Cavity forming structural support assembly forming a chassis element of internal combustion engines, comprising:

an elongated member made of metal or fiber reinforced plastic material including a peripheral wall having a plurality of internal longitudinally extending wall portions defining a longitudinally extending cavity and further including a plurality of secondary longitudinal cavities at least partially surrounding said primary cavities;

capping means formed from materials different than said elongated member and forming a respective end of the elongated member and including transverse walls forming cavities within said elongated member and enclosing said secondary longitudinal cavities, said capping means including a portion extending inside the walls of the hollow-section chamber and in pressing engagement therewith;

a support member extending transversely into the primary cavity of said elongated member and being connected to the inner wall portion of said capping means; and means permitting fluid to be passed through said elongated member via said cavity; and further comprising an extruded rigid hollow section having open ends and being inserted into said primary longitudinal cavity to be in pressing engagement with the inner walls thereof and including a ceramic light-weight porous material with a hardened surface formed of ceramic.

* * * * *